(12) United States Patent
Takata et al.

(10) Patent No.: US 6,357,888 B1
(45) Date of Patent: Mar. 19, 2002

(54) SURFACE ILLUMINANT DEVICE EMITTING LIGHT IN MULTIPLE DIRECTIONS IN CONCENTRATIVE MANNER

(75) Inventors: Manabu Takata; Takayoshi Tanabe, both of Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/401,806

(22) Filed: Sep. 22, 1999

(30) Foreign Application Priority Data

Sep. 24, 1998 (JP) .......................................... 10-269257
Jun. 18, 1999 (JP) .......................................... 11-172473

(51) Int. Cl.$^7$ ................................................ F21V 7/04
(52) U.S. Cl. .................................. 362/31; 362/26
(58) Field of Search .............................. 362/31, 26, 27; 385/146

(56) References Cited

U.S. PATENT DOCUMENTS 5,598,280 A   1/1997   Nishio et al. ................. 362/31

FOREIGN PATENT DOCUMENTS

| EP | 0 317 250 | 5/1989 |
| EP | 0 457 009 | 11/1991 |
| EP | 0 597 261 | 5/1994 |
| EP | 0 819 970 | 1/1998 |
| JP | 2-000017 | 1/1990 |
| JP | 2-084618 | 3/1990 |
| JP | 8-262441 | 10/1996 |
| JP | 8-262442 | 10/1996 |

*Primary Examiner*—Stephen Husar
(74) *Attorney, Agent, or Firm*—Nixon & Vanderhye P.C.

(57) ABSTRACT

A surface illuminant device includes a surface illuminant having a light distribution characteristic with no directivity relative to specific directions, and a prism sheet having a plurality of prisms each having a predetermined apical angle. The prism sheet is placed on the light emission side of the surface illuminant. One side of the prism sheet on which a plurality of prisms are placed is opposite to the light emission side of the surface illuminant. Accordingly, light can be emitted in a plurality of specific directions in concentrative manner to enhance luminance in that plurality of directions. Further, the surface illuminant device includes an optical sheet which condenses the incident light. In the luminance distribution (light distribution characteristic) thus obtained, the luminance gently decreases in the vicinity of the directions in which light is emitted in concentrative manner.

15 Claims, 12 Drawing Sheets

SURFACE ILLUMINANT DEVICE EMITTING LIGHT IN MULTIPLE DIRECTIONS IN CONCENTRATIVE MANNER

BACKGROUND OF THE INVENTION

1. Field of the Invention

The present invention relates to a surface illuminant device which can be used as a backlight of a liquid crystal display device or the like.

2. Description of the Background Art

A conventional backlight of a liquid crystal display device or the like generally employs an edge light system. In the edge light system, a cold cathode fluorescent tube is used as light source and placed on a side (edge) of a light guide plate, an optical sheet is placed on a surface of the light guide plate from which light is emitted (light emission surface), and a reflecting material is placed on the bottom side of the light guide plate (the side opposed to the light emission surface). Efforts have been made to improve efficiency in use of light and accordingly enhance luminance by adjusting the shape of the light guide plate as well as the shape and type of the optical sheet. Further, efforts have been made to emit the light from the light emission surface in all directions as uniformly as possible.

In addition, efforts have been made to improve luminance in the direction normal to the light emission surface by using a prism sheet or the like according to use, so as to emit the light in the direction of the normal line in concentrative manner. Alternatively, efforts have been made to improve luminance in a specific direction by emitting light in the specific direction in concentrative manner.

Japanese Patent Laying-Open No. 8-262441, for example, discloses a surface illuminant element which emits light in the direction of normal line in concentrative manner by the structure constituted of a light source having directivity in two specific directions and a prism sheet arranged such that the apical angle of a prism faces downward. Japanese Patent Laying-Open No. 8-262442 discloses a surface illuminant element which emits light just in a desired direction in concentrative manner by employing the structure similar to that disclosed in Japanese Patent Laying Open No. 8-262441.

However, when the conventional technique is employed in the car navigation, for example, in which the liquid crystal display device is located at the central portion of the car and persons in the driver's seat and the passenger seat watch the display device from two specific directions, a relatively large amount of light is emitted in directions other than the watching directions and thus improvements in the efficiency in use of the light are demanded in the conventional technique.

SUMMARY OF THE INVENTION

The present invention has been made to solve the problems above. One object of the present invention is to provide a surface illuminant device to emit light in a plurality of directions in concentrative manner and accordingly enhance luminance in the plurality of directions.

Another object of the present invention is to provide a surface illuminant device to emit light in two specific directions in concentrative manner and accordingly enhance luminance in the two specific directions.

Still another object of the present invention is to provide a surface illuminant device which has a luminance distribution (light distribution characteristic) with a gentle decrease in luminance in the vicinity of the direction in which the light is emitted in concentrative manner.

According to an aspect of the invention to accomplish the objects above, the surface illuminant device includes a surface illuminant which does not allow light to be emitted in a specific direction and a first optical element which has a plurality of prisms each having a predetermined apical angle. The first optical element is arranged on a light emission side (the side from which light is emitted) of the surface illuminant.

Preferably, the first optical element has one side and the other side opposite to the one side and the plurality of prisms are placed on the one side of the first optical element.

Still preferably, the one side of the first optical element on which the plurality of prisms are placed is opposite to the light emission side of the surface illuminant.

Preferably, the predetermined apical angle is 60° to 94°.

Preferably, the plurality of prisms are a plurality of linear prisms elongating in a first direction each having a substantially triangular cross section, and they are arranged with their respective apical angles facing in a second direction which crosses the first direction.

Preferably, the plurality of prisms are arranged in a third direction which crosses the first and the second direction.

Preferably, the plurality of prisms are a plurality of linear prisms elongating in a first direction having a wave-shaped cross section, and they are arranged with respective apical angles facing in a second direction which crosses the first direction.

Preferably, the plurality of prisms are arranged in a third direction which crosses the first and the second direction.

Preferably, the surface illuminant device further includes a second optical element which condenses incident light.

Still preferably, the second optical element is arranged on a light emission side of the first optical element.

According to the present invention as described above, a surface illuminant device can be provided which emits light in a plurality of specific directions in concentrative manner to enhance luminance in the plurality of specific directions. Further, a surface illuminant device can be provided which emits light in two specific directions in concentrative manner to enhance luminance in the two specific directions. In addition, a surface illuminant device can be provided which has a luminance distribution (light distribution characteristic) with a gentle decrease in luminance in the vicinity of the direction in which light is emitted in concentrative manner.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
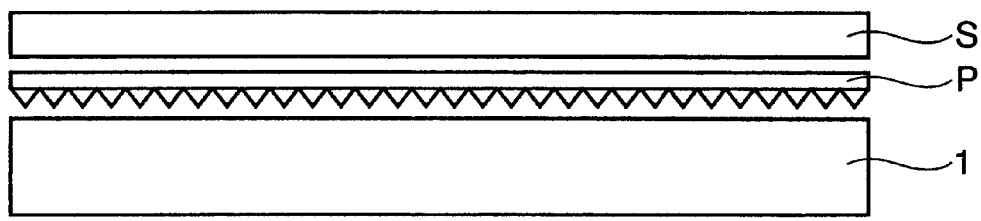
FIG. 1 is a side view of a surface illuminant device.
Figure 2:
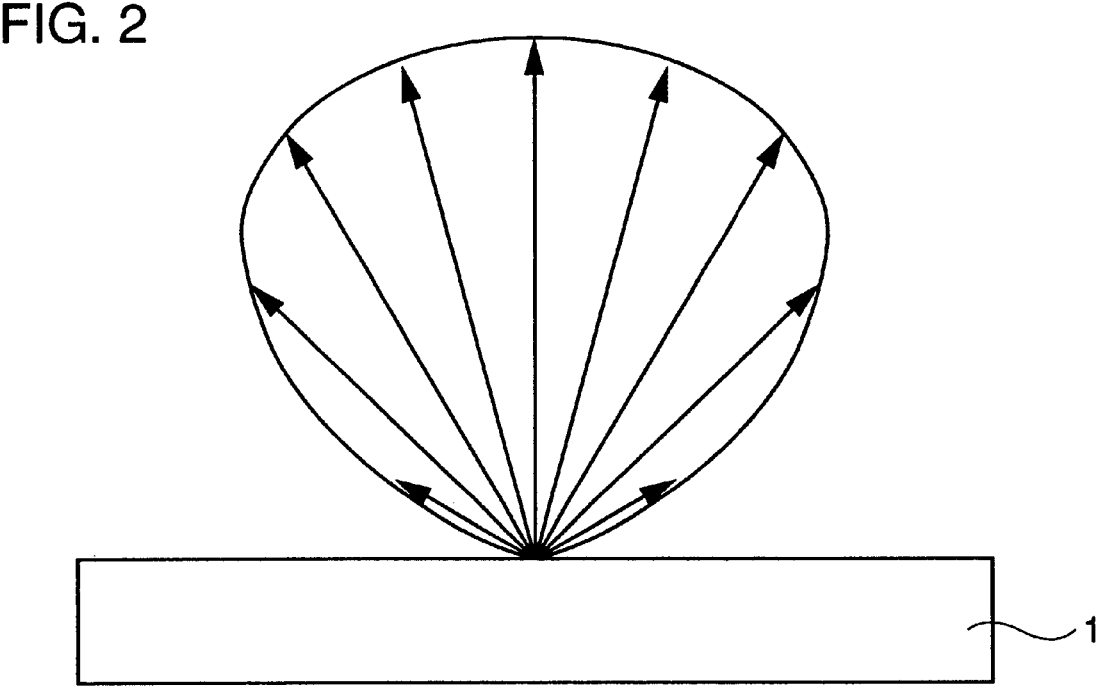
FIG. 2 illustrates a luminance characteristic of a surface illuminant.

A surface illuminant device according to the present invention is hereinafter described in detail based on the attached drawings. Referring to FIG. 1, the surface illuminant device of the present invention is constructed of a surface illuminant 1 and optical elements P and S. Surface illuminant 1 is a light source which has a luminance characteristic as shown in FIG. 2. Optical element P functions to direct emitted light in two particular directions. Optical element S functions to condense the emitted light. Surface illuminant 1 and optical elements P and S are combined to constitute the surface illuminant device which has a luminance distribution (light distribution characteristic) where light is directed in two desired directions and the luminance gentry decreases in the vicinity of the two desired directions.

Figure 3A:
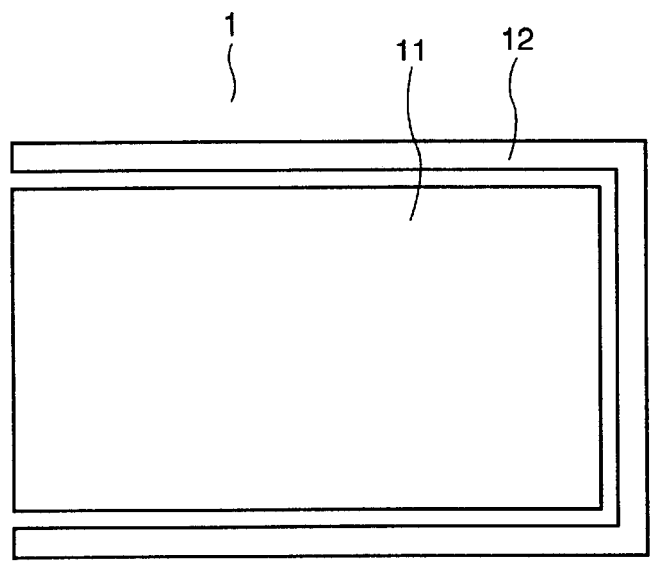
FIG. 3A is a plan view of the surface illuminant.
Figure 3B:
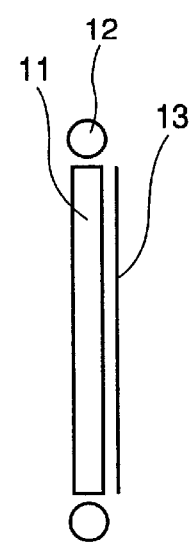
FIG. 3B is a left side view of the surface illuminant.
Figure 4:
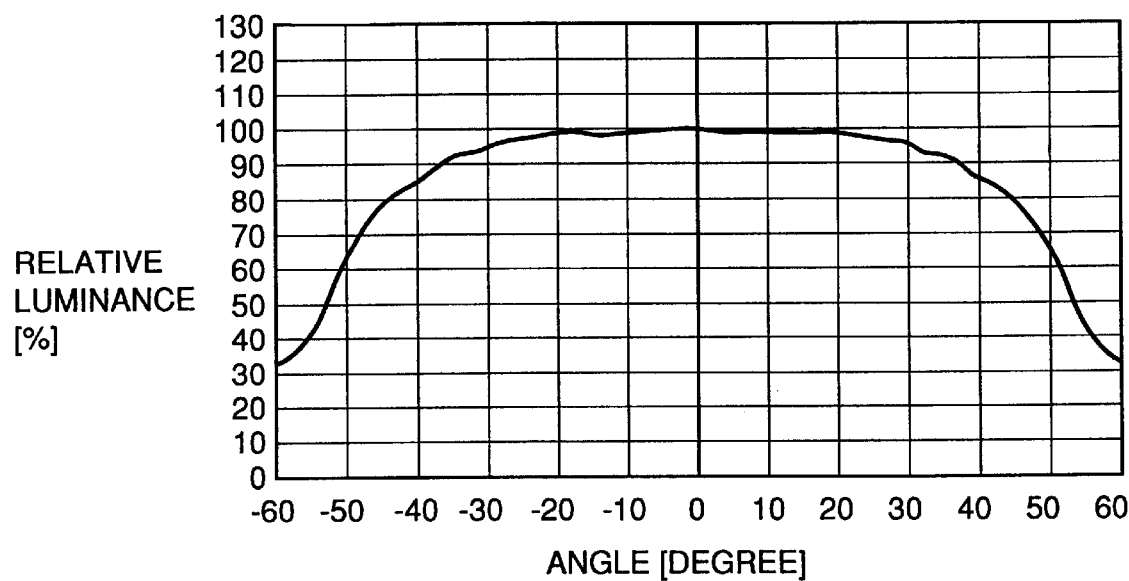
FIG. 4 illustrates a relation between an angle of light to the normal line of a plane of the surface illuminant and a relative luminance of that light (luminance distribution relative to angle).

Specifically, surface illuminant 1 having the luminance characteristic as illustrated in FIG. 2 is structured as shown in FIGS. 3A and 3B. A fluorescent tube 12 having a 90° inverted U shape is placed to surround the side and edge portions of a light guide plate 11 formed of transparent acrylic resin. Light guide plate 11 is 76.5 mm in length, 131.4 mm in width, and 4 mm in thickness. The outer diameter of fluorescent tube 12 is 2.6 mm. Satin finish is applied to the back surface of light guide plate 11. Further, a diffuse reflection sheet 13 is placed on the satin-finished back surface of light guide plate 11. A relation between an angle of light to the line which is normal to the surface of light guide plate 11 of surface illuminant 1 and a relative luminance of the light is illustrated in FIG. 4. Referring to FIG. 4, a distribution characteristic is shown which has a small variation in luminance throughout a wide viewing angle. Although fluorescent tube 12 having 90° inverted U shape is herein used, a linear fluorescent tube may be employed. In other words, any two-dimensional light source is applicable if it has the light distribution characteristic as shown in FIG. 2.

Figure 5:
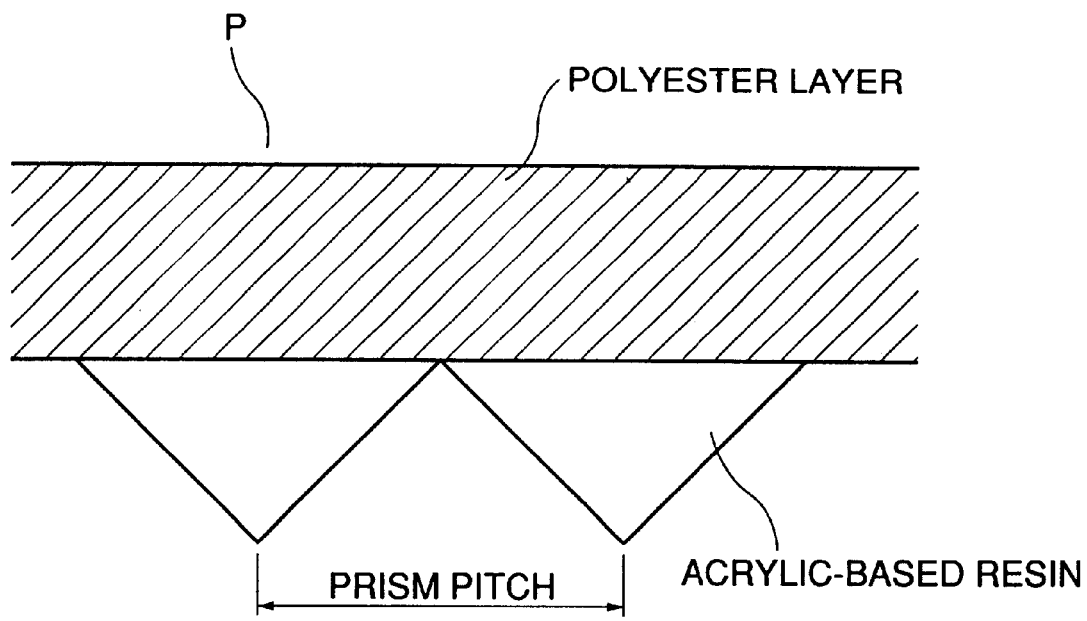
FIG. 5 is a partial cross sectional view of an optical element P.

Description on optical element P is now given. Optical element P is shaped like a sheet and formed of a number of linear prisms each having an apical angle of 90° which is located on the side of the plane of incidence. In other words, the prism is a triangular prism having a cross section in the shape of a right triangle. Referring to FIG. 5 showing a cross section of optical element P, the total thickness of the sheet is 160 $\mu$m, and triangular prisms each having an apical angle of 90° are linearly arranged on a base of polyester layer having a thickness of 132 $\mu$m. There is no change in optical characteristics if the apical angle is-in a range of 90°±4°. Here, ±4° is determined by considering the allowance on fabrication of the prisms and assembly of the surface illuminant device. The prism portion is made of acrylic-based resin, 28 $\mu$m in thickness, and the pitch of prisms is 50 $\mu$m. In the prism sheet, in order to prevent wear of the prism apex, a curving process is applied to the prism apex to give a curve of radius 8 $\mu$m. Further, in order to prevent the light emission surface from adhering to optical element S described below, mat process is applied to the light emission surface.

Suppose that a liquid crystal display device is applied to car navigation, for example, and placed between the driver's seat and the passenger seat. In this case, a desired condition of the apical angle of the prism is 90°. If the apical angle ranges from 60° to 94°, the light can be directed in two directions according to use.

Figure 6:
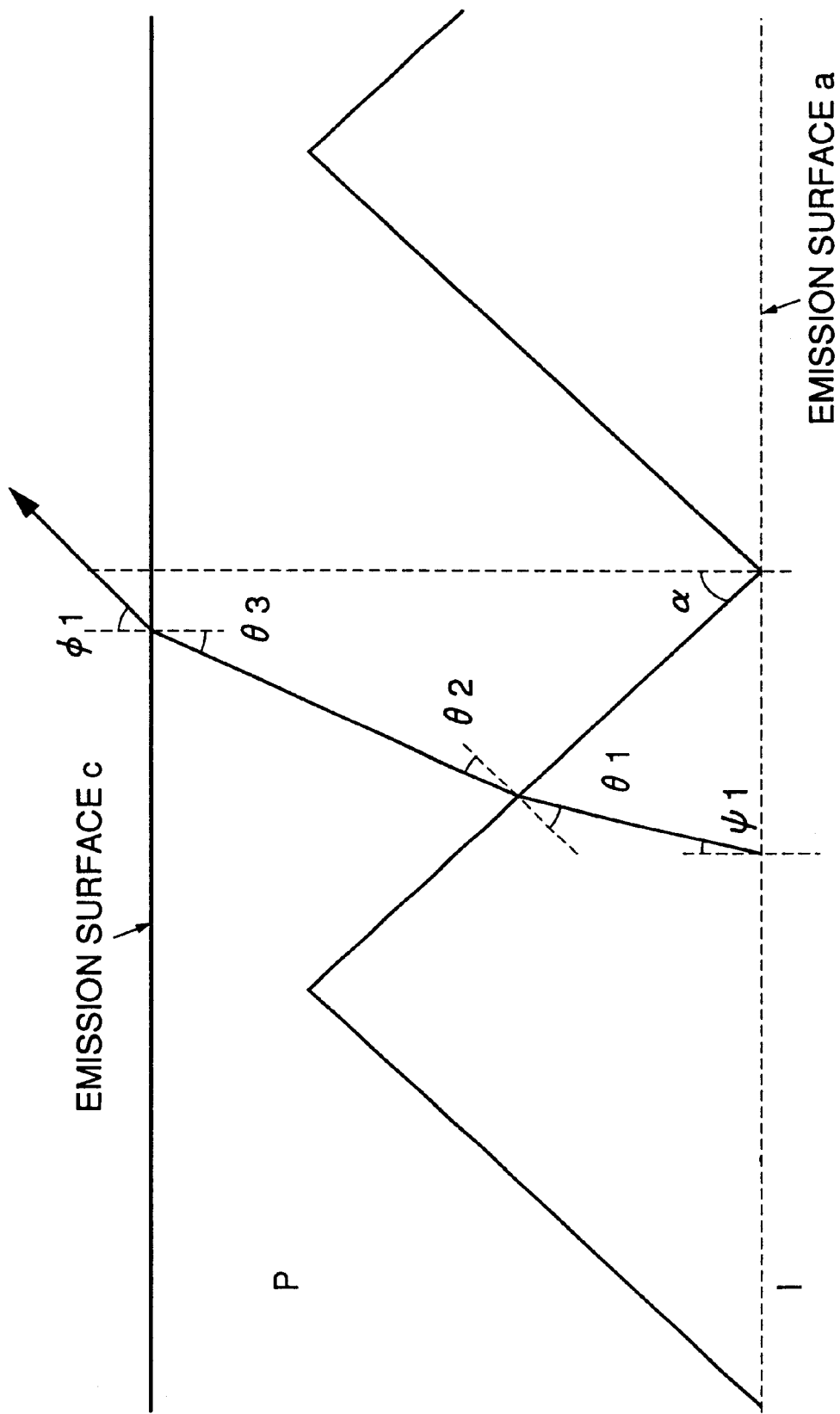
FIGS. 6 to 8 each illustrate an optical path through the optical element P.
Figure 7:
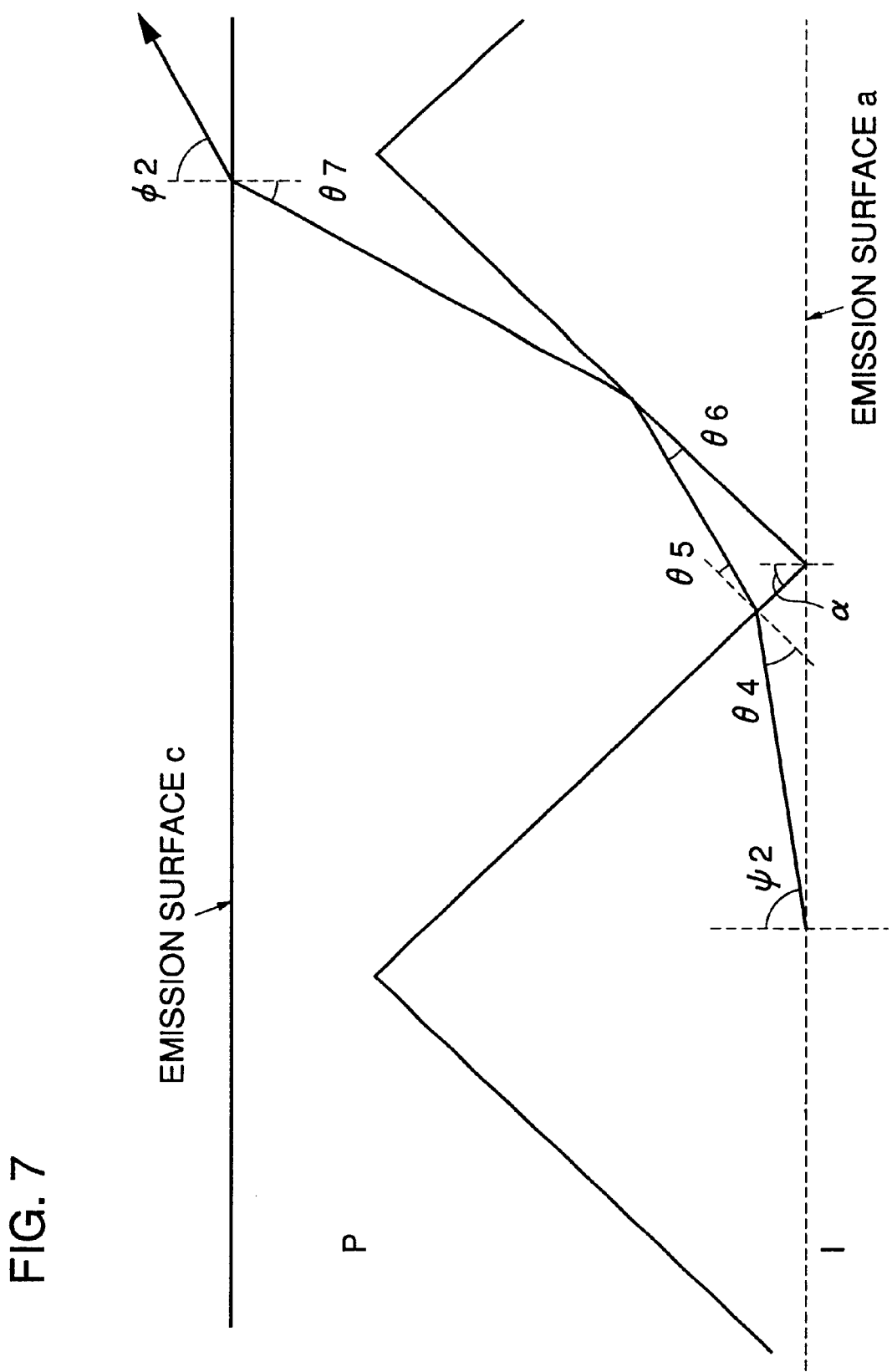
Figure 8:
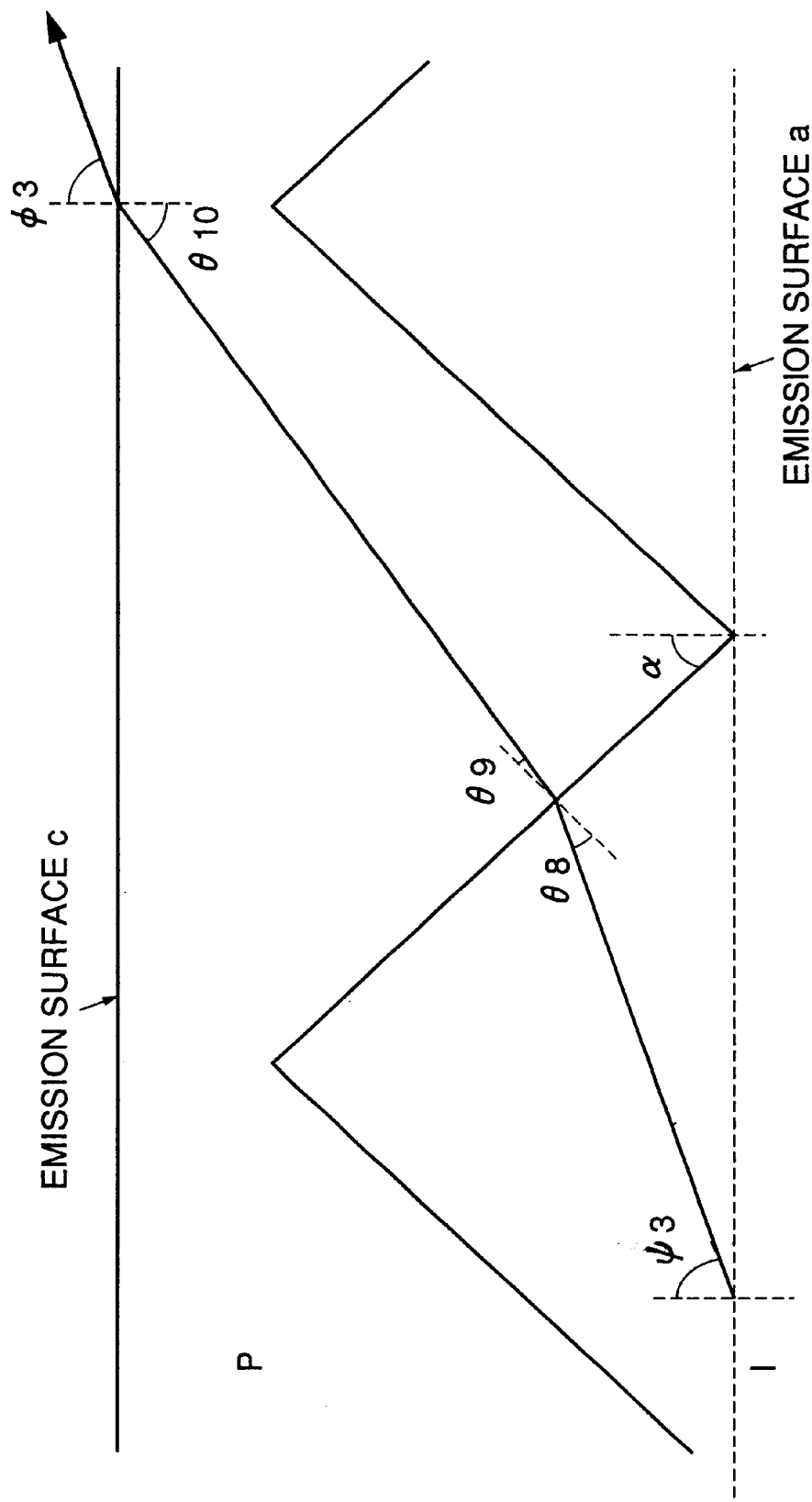

The optical path through optical element P is described next in conjunction with FIGS. 6 to 8. Referring to FIGS. 6 to 8, there are generally three types of optical paths as listed below, through which light is emitted from a light emission surface c of optical element P.

(1) Light is incident on the inclined plane of the prism from beneath a line normal to the inclined plane of the prism to be emitted from emission surface c as shown in FIG. 6.

(2) Light is incident on the inclined plane of the prism from above the line normal to the inclined plane of the prism to be reflected from the adjacent inclined plane of the prism and thereafter emitted from emission surface c as shown in FIG. 7.

(3) Light is incident on the inclined plane of the prism from above the line normal to the inclined plane of the prism to be emitted from emission surface c as shown in FIG. 8.

A luminance distribution of the light emitted from emission surface c of optical element P relative to angle is calculated for the case in which light is emitted from the surface illuminant having the luminance distribution relative to angle as shown in FIG. 4 and enters optical element P.

Referring to FIG. 6, an angle of light emitted from emission surface c of optical element P to the line normal to emission surface c ($\Phi1$) is calculated as shown below. In FIG. 6, $\alpha$ represents an angle of the inclined plane of the prism to the line normal to an emission surface a of surface illuminant 1, $\theta1$ to $\theta3$ represent an angle of the line normal to the inclined plane of the prism or the line normal to emission surface c to light ray, and $\Psi1$ represents an angle of the line normal to emission surface a to light ray.

$\sin \Phi1 = n \sin \theta3$ $\theta2 + \theta3 = 90° - \alpha$ $n \sin \theta_2 = \sin \theta_1$ $\theta_1 + \Psi_1 = 90° - \alpha$ $\Phi_1 = \sin^{-1}(n \sin(90° - \alpha - \sin^{-1}(n^{-1} \sin(90° - \alpha - \Psi_1))))$ (equation 1)

Referring to FIG. 7, the angle $\Phi_2$ of the light emitted from emission surface c of optical element P to the line normal to emission surface c is calculated as below. In FIG. 7, $\alpha$ represents an angle of the inclined plane of the prism to the line normal to emission surface a of surface illuminant 1, $\theta_4$ to $\theta_7$ represent an angle of the line normal to the inclined plane of the prism or the line normal to emission surface c to light ray, and $\Phi_2$ represents an angle of the line normal to emission surface a to light ray.

$\sin \Phi_2 = n \sin \theta_7$ $\theta_6 + \theta_7 = \alpha$ $\theta_6 = 90° + \theta_5 - 2\alpha$ $\sin \theta_4 = n \sin \theta_5$ $\Psi_2 - \theta_4 = 90° - \alpha$ $\Phi_2 = \sin^{-1}(n \sin(3\alpha - 90° - \sin^{-1}(n^{-1} \sin(\Psi_2 - 90°\alpha))))$ (equation 2)

Referring to FIG. 8, the angle $\Phi_3$ of the light emitted from emission surface c of optical element P to the line normal to emission surface c is calculated as below. In FIG. 8, $\alpha$ represents an angle of the inclined plane of the prism to the line normal to emission surface a of surface illuminant 1, $\theta_8$ to $\theta_{10}$ represent an angle of the line normal to the inclined plane of the prism or the line normal to emission surface c to light ray, and $\Psi_3$ represents an angle of the line normal to emission surface a to light ray.

$\sin \Phi_3 = n \sin \theta_{10}$ $\theta_{10} - \theta_9 = 90° - \alpha$ $n \sin \theta_9 = \sin \theta_8$ $\Psi_3 - \theta_8 = 90° - \alpha$ $\Psi_3 = \sin^{-1}(n \sin(90° - \alpha + \sin^{-1}(n^{-1} \sin(\Psi_3 - 90° + \alpha))))$ (equation 3)

In this way, equations 1 to 3 are derived. For the purpose of description here, the apical angle of the prism is defined as 90° and refractive index n of optical element P relative to the air is defined as 1.5 though the refractive index differs depending on the material used.

Regarding optical element P formed of the prism sheet, the critical angle of reflection when the light is emitted into air is about 42°. $\theta_{10}$ in FIG. 8 is greater than the critical angle of reflection, and accordingly the light as illustrated in FIG. 8 is not emitted. Therefore, equation 3 is unnecessary.

Figure 9A:
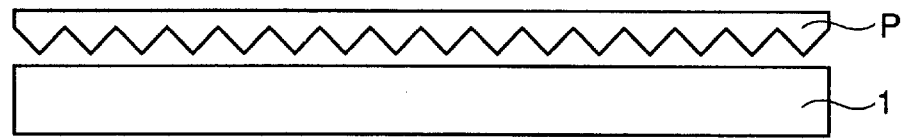
FIG. 9A is a side view of the surface illuminant device in which the optical element P is placed on the surface illuminant.
Figure 9B:
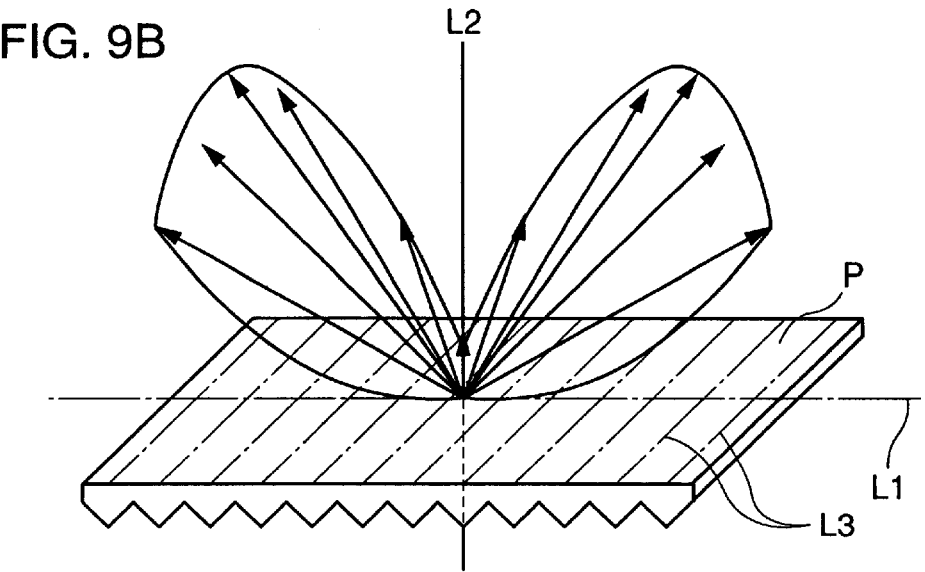
FIG. 9B illustrates distribution of light emitted from the optical element P in the device shown in FIG. 9A.
Figure 9C:
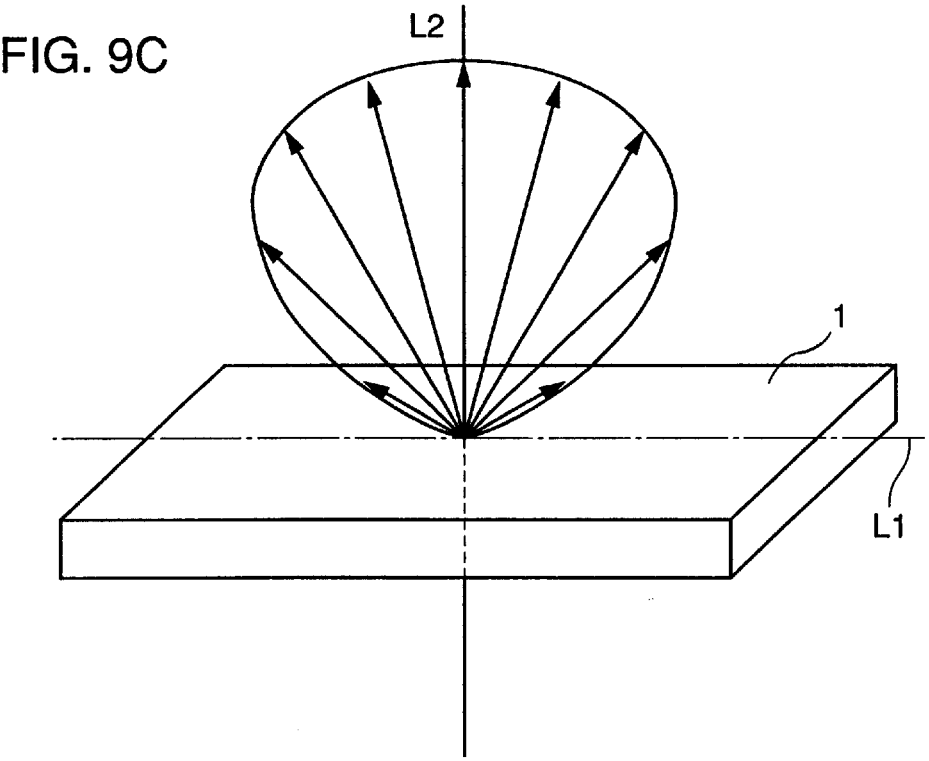
FIG. 9C illustrates distribution of light emitted from the surface illuminant in the device shown in FIG. 9A.

Referring to FIGS. 9A to 9C, optical element P is arranged on surface illuminant 1, where L3 represents the direction of the edge of the linear prisms of optical element P, L1 represents a line which lies on planes of surface illuminant 1 and optical element P to form an angle of 90° to the edge direction L3 of the prism, and L2 represents a line normal to the planes of surface illuminant 1 and optical element P. Although surface illuminant 1 having the structure as shown in FIGS. 3A and 3B is employed here as a specific example of the surface illuminant, any structure may be used if it provides the luminance distribution as illustrated in FIG. 2. The positional relation between the fluorescent tube and the edge direction L3 of the prism does not matter.

Figure 10:
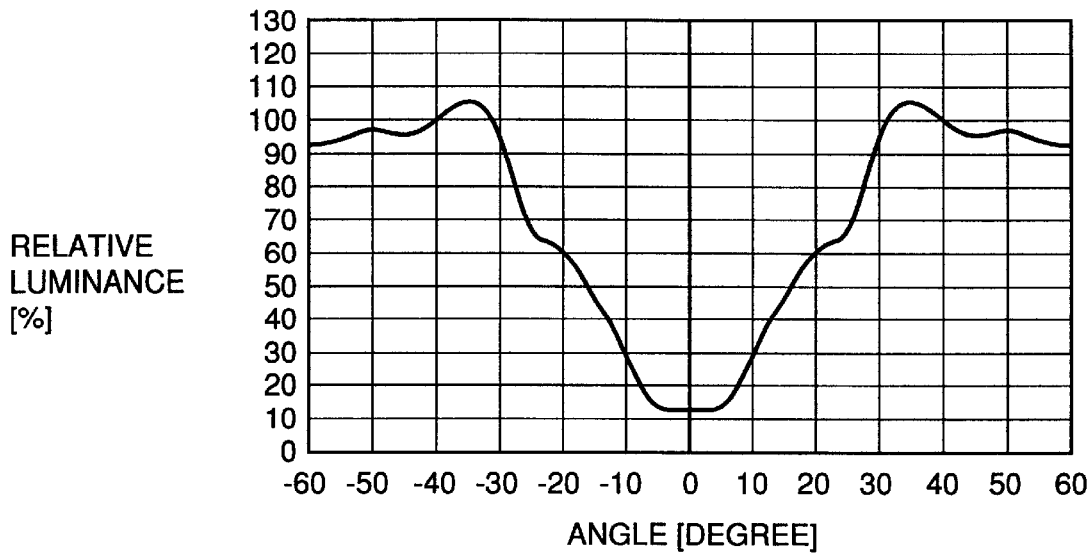
FIG. 10 illustrates a luminance distribution relative to angle exhibited by the device shown in FIG. 9A

The light emitted from surface illuminant 1 exhibits the distribution as illustrated in FIG. 4. $\alpha = 45°$ and $n = 1.5$ are substituted in equations 1 and 2 to calculate the distribution of the light emitted from emission surface c of optical element P relative to angle. Here, the light is emitted from surface illuminant 1 exhibiting distribution as shown in FIG. 4, and then emitted from emission surface c of optical element P. The result of calculation is shown in FIG. 10. The calculation of the luminance distribution is made by dividing the light emitted from surface illuminant 1 into tiny components, calculating the angle of light emitted from emission surface c for each component using equations 1 and 2, and integrating intensities corresponding to respective angles for the entire range of the light emitted from surface illuminant 1.

The surface illuminant device is herein supposed to be applied to car navigation. It is confirmed that light is directed such that the luminance peak of the light is in the vicinity of the angles of approximately ±30° corresponding to the directions of the driver's seat and the passenger seat respectively. Thus it is possible to provide a surface illuminant device which can direct the emitted light in two specific directions using optical element P.

Although the surface illuminant device constructed of surface illuminant 1 and optical element P can direct the light in two specific directions, the luminance drastically decreases when the viewing angle slightly shifts leading to deterioration in display characteristics. It is noted that the display is also viewed head-on and viewed from the rear seat, not just from the driver's seat and the passenger seat. An issue to be improved is that the luminance considerably deteriorates in the direction normal to the display, leading to poor view if the display is watched head-on or from the rear seat.

Figure 11:
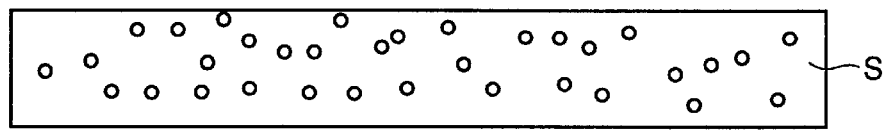
FIG. 11 is a cross sectional view of an optical element S.

In order to improve this issue; optical element S is provided on surface illuminant 1 and optical element P as shown in FIG. 1. In this embodiment, as described above, the prism sheet having a number of linear prism units each having an apical angle of 90° and formed at the plane of incidence is used as optical element P., and the optical sheet having a function of condensing diffused light is used as optical element S. Specifically, an optical sheet of model number D121 by Tsujiden Co., Ltd. is employed. Referring to FIG. 11, a number of beads having condensing effect are dispersed in optical element S. The sheet is made of polyester resin and has a thickness of approximately 130 to 140 $\mu$m.

Figure 12:
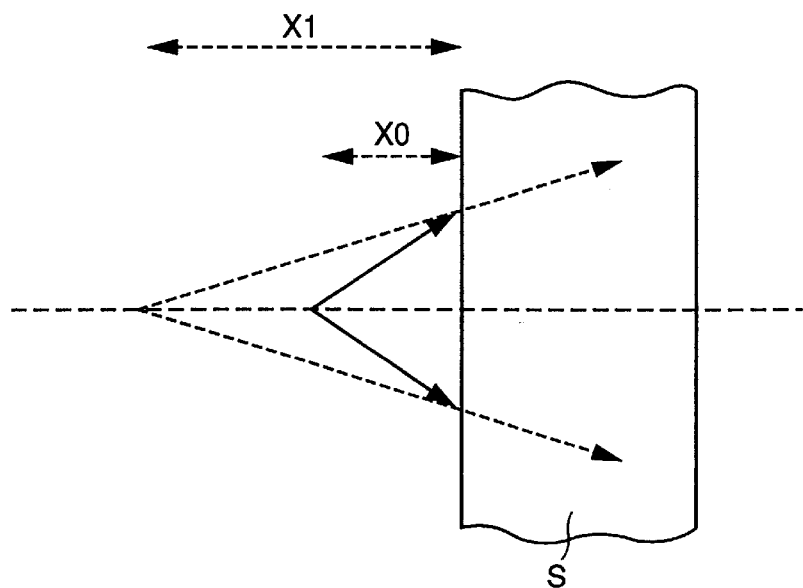
FIG. 12 illustrates a light condensing effect of the optical element S.
Figure 13:
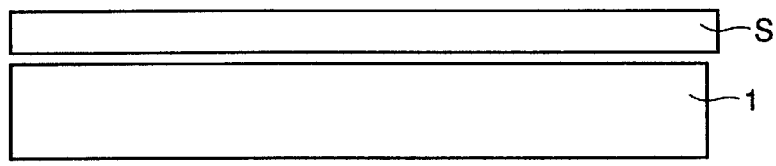
FIG. 13 is a side view of a surface illuminant device in which the optical element S is placed on the surface illuminant.

The condensing effect of optical element S is described now. In the optical system as illustrated in FIG. 12, when light emitted from a light source located at a distance X0 from optical element S is condensed by optical element S as if the light is emitted from a light source located at a distance X1 from optical element S, the condensing effect can be represented by an expression X1/X0. In this embodiment, a main axis of light distribution before the light enters optical element S is at about 40°, and a main axis of light distribution for the light emitted from optical element S is at about 30°. In this case, the condensing effect of optical element S is represented by $\tan 40°/\tan 30° = 1.45$. Suppose that the angle to be attained is approximately 30° and an allowable range thereof is 30°±5°, the condensing effect of optical element S ranges from about 1.2 to 1.8.

Apart from the type described above, optical element S may be a cylindrical lens array, a convex lens, or a micro lens array. The required optical condition is just to satisfy the condensing effect described above.

Figure 14:
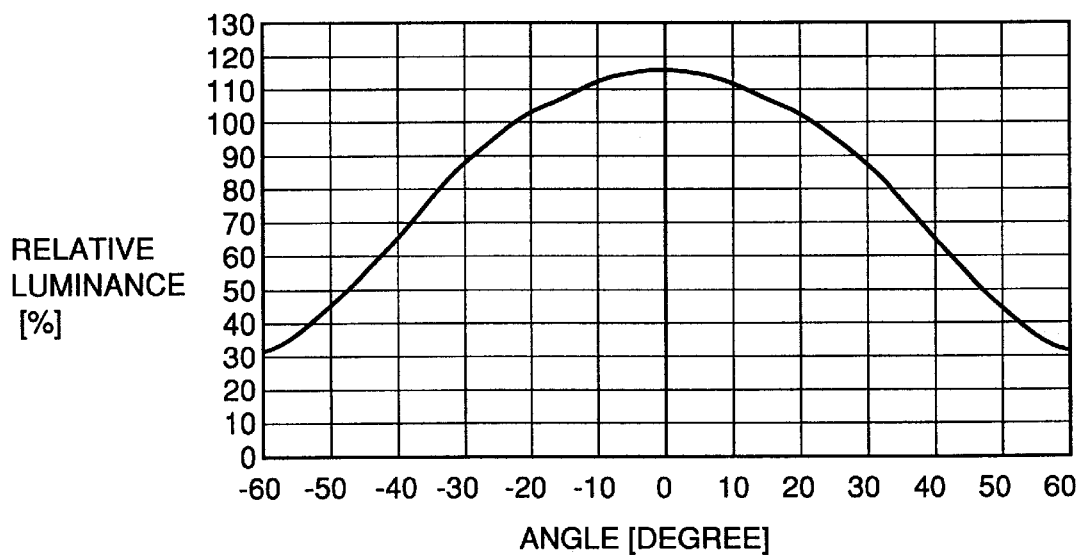
FIG. 14 illustrates a luminance distribution relative to angle exhibited by the device shown in FIG. 13.

When comparison is made between FIG. 4 and FIG. 14, it can be confirmed that optical element S has the condensing effect relative to the direction normal to the emission surface.

Figure 15:
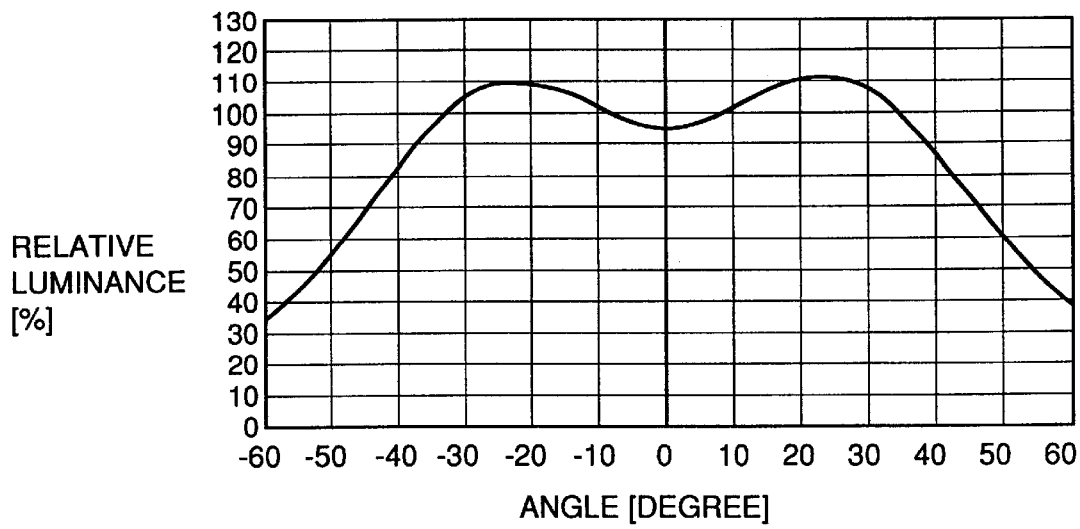
FIG. 15 illustrates a luminance distribution relative to angle exhibited by a surface illuminant device in which optical elements P and S are placed on the surface illuminant.
Figure 16:
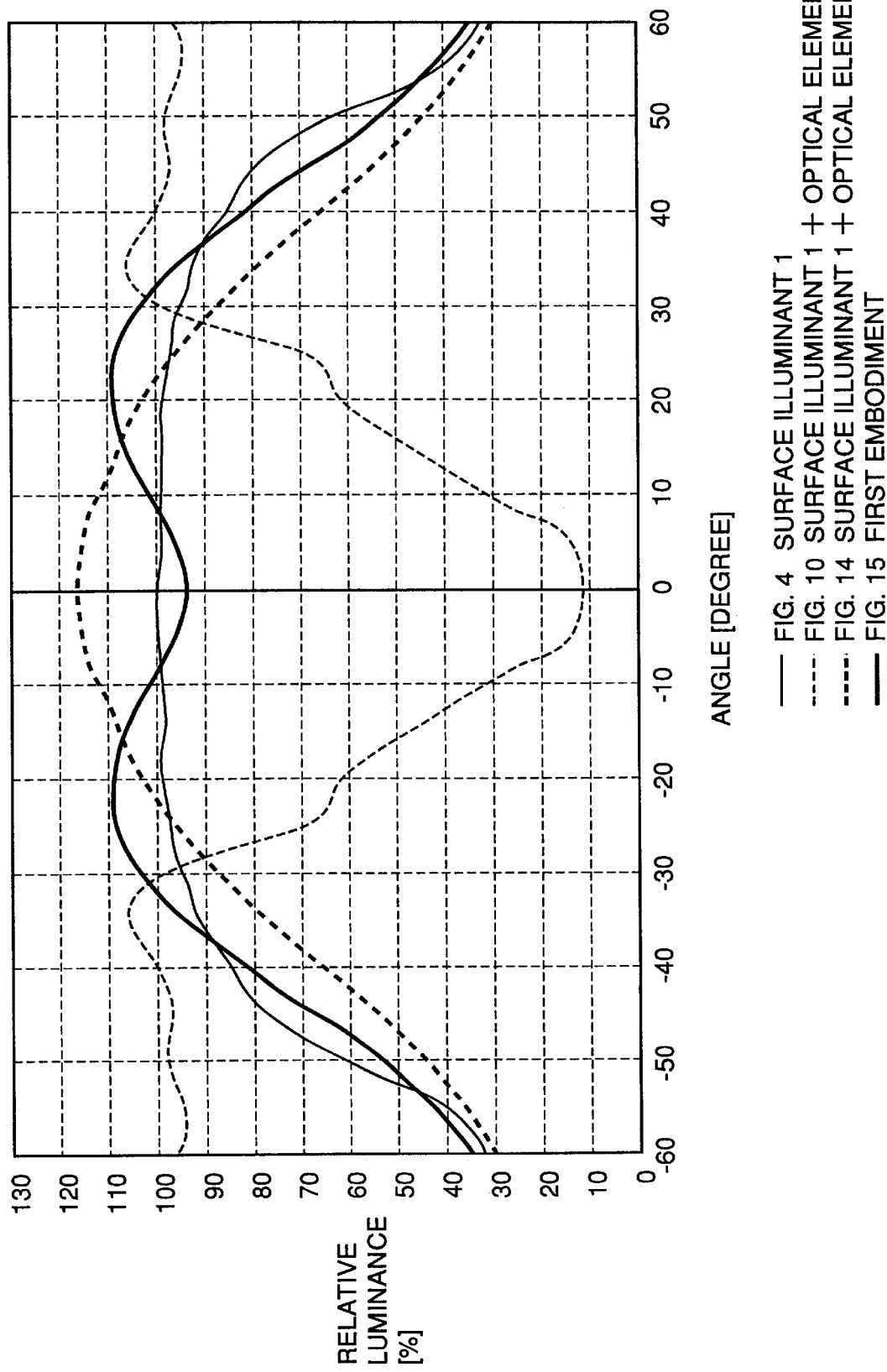
FIG. 16 collectively shows the distributions illustrated in FIGS. 4, 10, 14 and 15.

Further, as shown in FIGS. 15 and 16 illustrating the luminance distributions relative to angle in the first embodiment, it can be confirmed that the luminance is relatively high in certain two specific directions and the luminance gently changes in the vicinity of those directions.

Therefore, if the surface illuminant device is applied to a liquid crystal display device for car navigation placed between the driver's seat and the passenger seat, the display screen seems to be bright and thus exhibits excellent display characteristics in the directions of the driver's seat and the passenger seat. Even if the viewing angle slightly shifts from the directions of the driver's and passenger seats, there is a relatively small change in luminance and thus superior display characteristics can be obtained.

Second Embodiment

Figure 17:
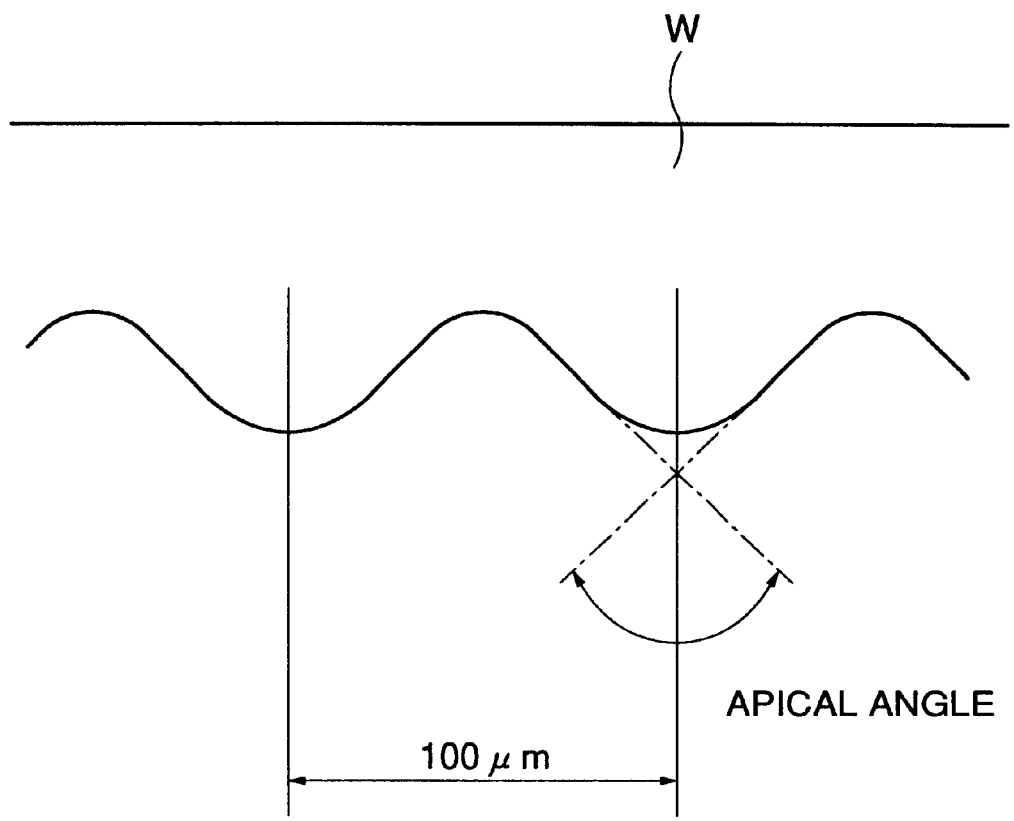
FIG. 17 is a partial cross sectional view of an optical element W.

A surface illuminant device in the second embodiment is now described. In the second embodiment, the surface illuminant device employs, instead of optical element P formed of linear prisms, an optical element W having a wave-like cross section at its incident surface as shown in FIG. 17. The difference between the surface illuminant devices in the first and second embodiments is just that the former has the prism-shaped optical element P while the latter has the wave-shaped optical element W. Other structures of the surface illuminant device in the second embodiment are similar to those in the first embodiment, and description thereof is not repeated here.

Figure 18:
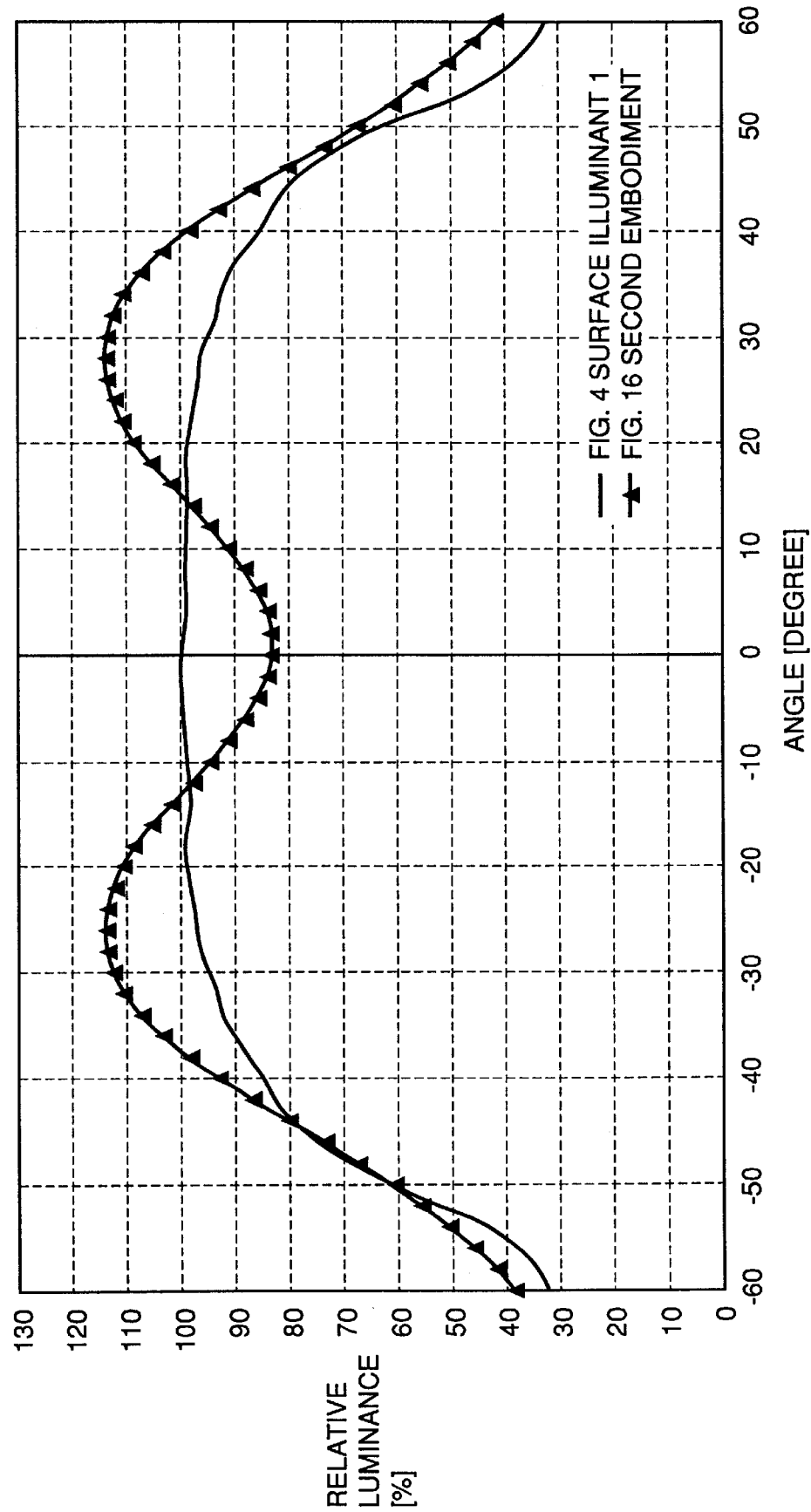
FIG. 18 illustrates a luminance distribution relative to angle exhibited by a surface illuminant device according to the second embodiment.

The second embodiment is also supposed to be applied to car navigation. As shown in FIG. 18, it is confirmed that the surface illuminant device in the second embodiment directs light such that the peak of luminance is at angles of approximately ±30° corresponding to the driver's seat and the passenger seat respectively. The surface illuminant device using wave-shaped optical element W thus allows the emitted light to be directed in two specific directions.

Distribution of the luminance of light emitted from surface illuminant 1 relative to the angle is shown in FIG. 18. The light condensing effect of optical element S also ranges from about 1.2 to 1.8 as in the first embodiment.

Referring to FIG. 17 again, optical element W is formed like a sheet having a number of curves constituting a wave. The apical angle of each curve is approximately 90° at the light incident surface. The apical angle of the curve herein refers to the angle formed by the tangents which meet first at the inflection points, the inflection point being located at a point where the differential value of the slope of the curve changes from + to − or − to +. The pitch of the curves is 100 $\mu$m. Optical element W has a total thickness of approximately 200 $\mu$m and is made of polycarbonate.

Specifically, model number W818 by Sekisui Chemical Co., Ltd. is employed here. The apical angle thereof is 97°. Model number W518 by Sekisui Chemical Co., Ltd. having apical angle of 81° also exhibits the characteristics as shown in FIG. 18. (The light condensing effect of optical element S when model number W518 is used also ranges from about 1.2 to 1.8.)

In view of this, if the apical angle of the curve ranges at least from 81° to 97°, the emitted light can be directed in two specific directions as shown in FIG. 18.

As clearly understood from the foregoing description, the arrangement of the optical elements according to the present invention allows light to be directed efficiently at desired angles (viewing angles), so that brightness can be achieved at the desired angles (viewing angles).

The surface illuminant device according to the first and second embodiments can distribute the emitted light in two specific directions and allow the luminance to gently change in the vicinity of the two specific directions. Therefore, if the surface illuminant device is applied to a liquid crystal display used for car navigation, for example, that is placed between the driver's seat and the passenger seat, the display screen seems to be bright from the driver's seat and the passenger seat and thus provide an excellent display characteristic. Even if the viewing angle slightly shifts from the direction of the driver's and passenger seats, there is no significant change in luminance and thus a fine display characteristic is obtained. In addition, even if the display is watched by a person in front of the display or in the rear seat, the luminance in the normal direction just slightly decreases and thus there is no influence on the display characteristic.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A surface illuminant device comprising:
    a surface illuminant which does not allow light to be directed in a specific direction;
    a first optical element having a plurality of prisms each having a predetermined apical angle of 90° plus/minus 4°,
    wherein said first optical element is placed on a light emission side of said surface illuminant, and
    wherein said first optical element has one side and the other side opposite to said one side, and wherein said plurality of prisms are placed on said one side of said first optical element, and wherein said one side of said first optical element on which said plurality of prisms are placed is opposite to said light emission side of said surface illuminant.

2. The surface illuminant device according to claim 1, wherein
    said plurality of prisms are a plurality of linear prisms elongating in a first direction each having substantially triangular cross section, and they are arranged with respective apical angles facing in a second direction which crosses said first direction.

3. The surface illuminant device according to claim 2, wherein
    said plurality of prisms are arranged in a third direction which crosses said first and second directions.

4. The surface illuminant device according to claim 1, wherein
    said plurality of prisms are a plurality of linear prisms elongating in a first direction each having a wave-shaped cross section, and they are arranged with respective apical angles facing in a second direction which crosses said first direction.

5. The surface illuminant device according to claim 4, wherein
    said plurality of prisms are arranged in a third direction which crosses said first and second directions.

6. The surface illuminant device according to claim 1, further comprising a second optical element which condenses incident light.

7. The surface illuminant device according to claim 6, wherein
    said second optical element is placed on a light emission side of said first optical element.

8. A surface illuminant device comprising:
    a surface illuminant which does not allow light to be directed in a specific direction;

a first optical element having a plurality of prisms each having a predetermined apical angle of from 81–97 degrees, wherein said first optical element is placed on a light emission side of said surface illuminant, and wherein said first optical element has one side and the other side opposite to said one side, and wherein said plurality of prisms are placed on said one side of said first optical element, and wherein said one side of said first optical element on which said plurality of prisms are placed is opposite to said light emission side of said surface illuminant.

9. The surface illuminant device according to claim 8, wherein said plurality of prisms are a plurality of linear prisms elongating in a first direction each having substantially triangular cross section, and they are arranged with respective apical angles facing in a second direction which crosses said first direction.

10. The surface illuminant device according to claim 9, wherein said plurality of prisms are arranged in a third direction which crosses said first and second directions.

11. The surface illuminant device according to claim 8, wherein said plurality of prisms are a plurality of linear prisms elongating in a first direction each having a wave-shaped cross section, and they are arranged with respective apical angles facing in a second direction which crosses said first direction.

12. The surface illuminant device according to claim 11, wherein said plurality of prisms are arranged in a third direction which crosses said first and second directions.

13. The surface illuminant device according to claim 8, further comprising a second optical element which condenses incident light.

14. The surface illuminant device according to claim 13, wherein said second optical element is placed on a light emission side of said first optical element.

15. A surface illuminant device comprising:

a surface illuminant which does not allow light to be directed in a specific direction;

a first optical element having a plurality of prisms each having a predetermined apical angle from 81° to 97°, wherein said first optical element is placed on a light emission side of said surface illuminant, and wherein said plurality of prisms are placed on the side of said first optical element facing said surface illuminant.

* * * * *